(12) United States Patent
Teetaert et al.

(10) Patent No.: US 7,677,020 B2
(45) Date of Patent: Mar. 16, 2010

(54) SPRING SYSTEM FOR A FEEDER ROLLER OF A HARVESTER

(75) Inventors: Pierre Erik Teetaert, Aartrijke (BE); André S. N. C. Ducoulombier, Wevelgem (BE)

(73) Assignee: CNH America LLC, New Holland, PA (US)

( * ) Notice: Subject to any disclaimer, the term of this patent is extended or adjusted under 35 U.S.C. 154(b) by 35 days.

(21) Appl. No.: 11/820,129

(22) Filed: Jun. 18, 2007

(65) Prior Publication Data

US 2008/0000209 A1 Jan. 3, 2008

(30) Foreign Application Priority Data

Jun. 29, 2006 (GB) .................................. 0612832.6

(51) Int. Cl.
*A01D 61/00* (2006.01)
(52) U.S. Cl. ............... 56/16.4 A; 56/16.4 R; 56/16.4 B
(58) Field of Classification Search ............... 56/16.4 R, 56/16.4 A, 16.4 B, 16.4 C, 16.4 D
See application file for complete search history.

(56) References Cited

U.S. PATENT DOCUMENTS

| 1,567,434 | A | * | 12/1925 | Flatley | .................... 56/16.4 R |
| 4,278,211 | A | | 7/1981 | Shriver | |
| 4,407,111 | A | * | 10/1983 | Brune et al. | ............. 56/16.4 R |
| 5,231,826 | A | * | 8/1993 | Jennings | ..................... 56/11.4 |
| 6,052,975 | A | * | 4/2000 | Kraus et al. | ............. 56/16.4 B |
| 6,779,326 | B2 | | 8/2004 | Muller et al. | |

* cited by examiner

*Primary Examiner*—Alicia M Torres
(74) *Attorney, Agent, or Firm*—Michael G. Harms; John William Stader; Patrick M. Sheldrake

(57) ABSTRACT

A spring system for a feeder device of an agricultural harvester having a first roller movably mounted in a casing and biased by the spring system towards a second roller in order the compress crop passing between the two rollers. The spring system comprises at least one spring surrounding a guide rod that extends in use between a movable support of the first roller and the casing of the feeder device. The guide rod is formed of two telescopically collapsible parts, one connected to the roller support and the other to the casing.

5 Claims, 4 Drawing Sheets

US 7,677,020 B2

SPRING SYSTEM FOR A FEEDER ROLLER OF A HARVESTER

CROSS REFERENCE TO RELATED APPLICATIONS

This Patent Application claims priority under 35 U.S.C. §119 to GB 0612832.6, filed on Jun. 29, 2006 titled, "Spring System for a Feeder Roller of a Harvester" and having Pierre Erik Teetaert and André S. N. C. Ducoulombier as inventors. The full disclosure of GB 0612832.6 is hereby fully incorporated herein by reference.

FIELD OF THE INVENTION

The invention concerns a spring system for a feeder roller of a harvester; in particular an upper feeder roller of a feeder device for a self-propelled forage harvester.

BACKGROUND OF THE INVENTION

Spring systems are encountered in feeder devices for forage harvesters, which in the predominant number today are equipped with two lower feeder rollers carried in bearing supports fixed in the feeder frame or casing and two upper feeder rollers working together with these. The upper feeder rollers designated in the following as pre-pressing and pressing rollers, are carried in bearing supports in the feeder casing so that their height can be altered, in order to be able to move upwards on the drawing in of harvested crop. In doing so, the spring system has the task of applying a defined roll force to the pre-pressing rollers and to the pressing rollers, so that in conjunction with the lower feeder rollers they can on the one hand compress the crop on being drawn in and on the other hand with the aid of this roll force make possible at all the drawing-in of the crop and its transport to the cylinder chopper.

Because of the increase in performance of forage harvesters required in recent years, ever higher demands are made upon their feeder equipment, which has led on the one hand to ever wider feeder devices and higher lift heights of the pre-pressing roller and of the pressing roller and to a further increase in the flow rate of the crop. These higher demands can then be fulfilled only if the roll forces exerted by the pre-pressing roller and the pressing roller on the crop are at least so great that the crop can still be compressed into a compact mat, which cannot be pulled in from the chopper cylinder. But on the other hand they must not be so great as to cause irregularities in the feeding process and blockages in the feeder device. The roll forces must increase significantly with growing layer thickness of the crop in order to obtain a uniform compactness and to compensate for the increased friction of the crop on the sidewalls of the feeder device. In the region of smaller layer thickness on the other hand, they must be kept small so that particularly in the case of the maize harvest the grains are not knocked out of the cob by too high roll forces which in the case of large chopped lengths has a particularly negative effect. Finally it is still to be pointed out that the roll forces are applied not only by the spring system, but also by the forces of reaction from the driving moment of the pre-pressing rollers and the pressing rollers, upon which the roller weights and frictional forces are dependent when raising and lowering them. The greater proportion comes, however, from the spring system, followed by the forces of reaction. The remaining quantities are practically negligible.

Numerous spring system have previously been proposed to fulfil these requirements but the closest prior art to the present invention is believed to be that described in US2003/0188521. Such a spring system is illustrated in FIGS. 1 to 3 of the accompanying drawings, in which:

FIG. 1 shows a perspective view from the front right of a feeder device with attached chopping device;

FIG. 2 shows a side view of the left side of the feeder device; and

FIG. 3 shows the pre-pressing roller in the uppermost position and the pressing roller raised by the connecting rod and pivoting crank.

Throughout this description, references to left and right are used as a matter of convenience and are determined by standing at the rear of the forage harvester and facing the forward end in the normal direction of travel. Likewise, forward and rearward are determined by normal direction of travel of the tractor or round baler. Upward or downward orientations are relative to the ground or operating surface. Horizontal or vertical planes are also relative to ground.

In FIG. 1, there is shown a feeder device 101 of a forage harvester with a chopping device 102 arranged on it in a perspective view from the front and the right, on which the spring system is implemented.

FIG. 2 shows a side view of its left side without the chopping device 102. The feeder device 101 has two upper feeder rollers, which according to the direction of flow of the crop are designated as the pre-pressing roller 103 and pressing roller. These are arranged opposite the front lower feeder roller 106, which is in bearing supports at a fixed position in the casing 105 of the feeder device 101, and the rear lower feeder roller 107 in such a way that their distance from these can be varied. For this the bearing supports 108 of the pressing roller are held in the front ends of oscillating cranks 109 of which the opposite ends are supported in bearings on pivot bolts 110 fixed in the casing 105 of the feeder device 101 so that they can pivot. On both sides on the shaft of the pressing roller, connecting rods 112 extend between the bearing supports 108 of the pressing roller and the bearing supports 113 of the pre-pressing roller 103. By means of the system of linkages formed by the cranks 109 and the connecting rods 112, the pressing and pre-pressing rollers are guided for movement relative to their respective stationary opposing rollers 107 and 106, the pressing roller being movable along an arc centred on the fixed pivot bolts 10 and the pre-pressing roller 103 being movable along an arc centred on the axis of the pressing roller.

The pressing and pre-pressing rollers are urged towards their fixed counterparts by spring systems 120, 122 and their separation varies during use to accommodate the volume of the crop flowing between them.

FIG. 3 shows the pre-pressing roller 103 raised maximally by the crop and the pressing roller 104 raised slightly.

Each spring systems 120, 122 acting to apply pressure to compress the crop comprises a spring 124, or two concentric springs 126, 128 in the case of the spring system 122, surrounding a guide rod 123, 125 which extends upwards from the bearing support of the respective roller and passes through a hole in the casing 105 of the feeder device 101. As can be seen from FIG. 3, as the pre-pressing and pressing rollers move up, the movement is opposed by the compression of the springs 124, 126 and 128 and at the same time the rods 123 and 125 protrude upwards from the casing of the feeder device 101.

This construction has certain disadvantages because the rods 123 and 125 are constantly moving up and down. As the rods are exposed, this movement presents a safety hazard and, as the rods are also in the field of view of the operator of the harvester, they provide an unnecessary distraction. Furthermore, the rods carry stops to set the minimum separation of the two pairs of rollers and when these stops come to rest against the casing 105 they make an irritating noise.

SUMMARY OF THE INVENTION

With a view to mitigating the foregoing disadvantages, the present invention provides a spring system for a feeder device of an agricultural harvester having a first roller movably mounted in a casing and biased by the spring system towards a second roller in order the compress crop passing between the two rollers, wherein the spring system comprises at least one spring surrounding a guide rod that extends between a movable support of the first roller and the casing of the feeder device, characterised in that the guide rod is formed of two telescopically collapsible parts, one connected to the roller support and the other to the casing.

If the first roller is guided to follow a linear path parallel to the axis of the guide rod, then the ends of the guide rod may be rigidly joined to the roller support and the casing. However, as the first roller is not normally constrained to follow a linear path, it is preferred for the guide rod to be pivotably connected to the roller support and the casing.

The spring(s) surrounding the guide rod act(s) to extend the guide rod to its maximum extent making installation and removal of the spring system difficult in view of the very large forces required to compress the spring.

It is therefore desirable to provide a stop for temporarily limiting the extension of the guide rod.

Preferably, the guide rod comprises an inner shaft connected to the roller support and an outer tube connected to the casing of the feeder device, or vice versa, and the stop comprises a rod threadedly engageable with the end of the inner shaft and passing through the outer tube, the opposite end of the rod having an abutment for engaging the opposite end of the outer tube to limit extension of the guide rod.

To assemble the spring system, the spring (or springs) is (are) placed about the guide rod and a suitable clamp is used to compress the spring(s). Once the length of the spring system has been reduced to less than the distance between the support of the first roller and the casing when the gap between the first and second rollers is at its minimum, the rod is inserted the outer tube of the guide rod and threaded onto the inner shaft. The abutment is then adjusted until it contacts the outer tube of the guide so that the spring remains compressed after removal of the clamp.

Alternatively, one can provide a rod that has sufficient length to extend beyond the end of the uncompressed spring(s) when threaded into the inner shaft. The abutment on the rod is then screwed onto the extending rod portion and used to compress the spring(s) until the necessary length for mounting into the feeder device is reached.

This allows the spring system to be inserted between the first roller as a pre-compressed sub-assembly and once in place the rod can be removed.

Removal of the spring system can be carried in reverse order, namely the rod can be engaged with inner shaft of the guide rod and the abutment adjusted until the spring is compressed. The guide rod with the compressed spring surrounding it can then be removed without any danger of the spring recoiling and causing injury.

BRIEF DESCRIPTION OF THE DRAWINGS

The invention will now be described further, by way of example, with reference to the accompanying drawings, in which:

FIG. 4 FIGS. 4A and 4B show a perspective view of the guide rod of a spring system of the present invention;

DETAILED DESCRIPTION OF THE PREFERRED EMBODIMENT

Figure 1:
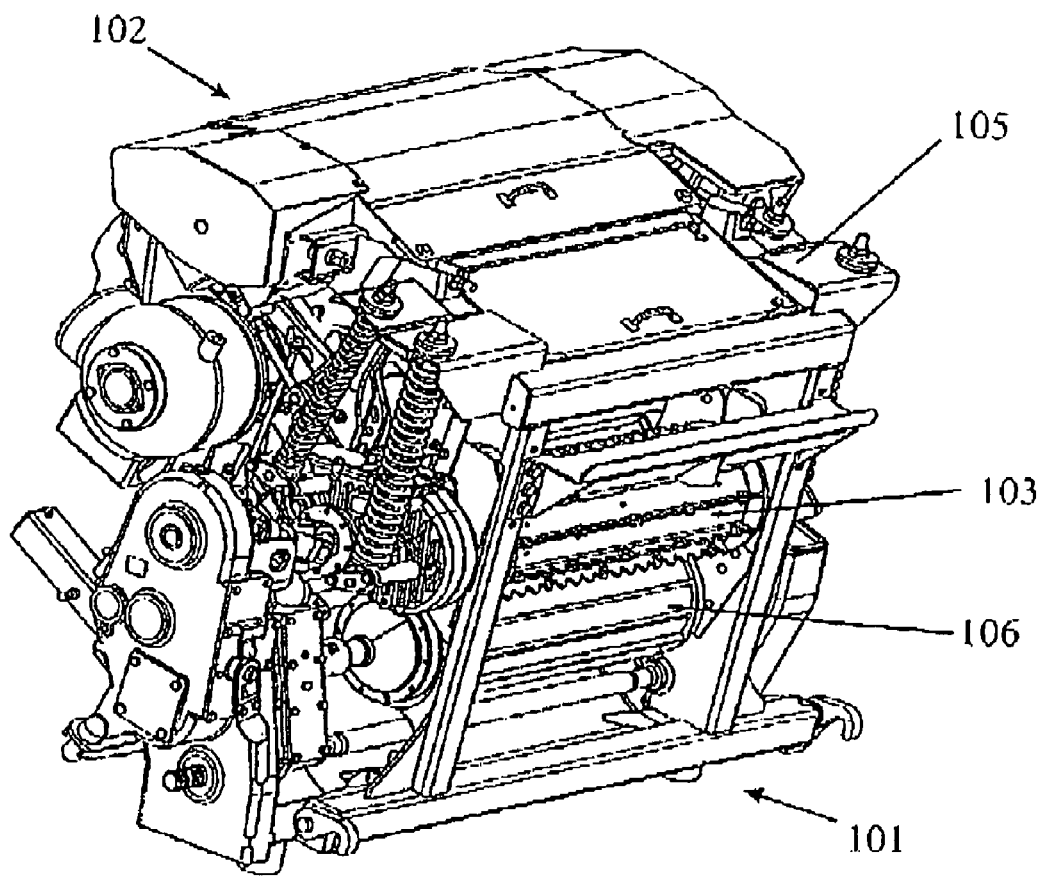
FIGS. 1 to 3 are, as previously described, drawings showing a feeder device known from US 2003/0188521.
Figure 3:
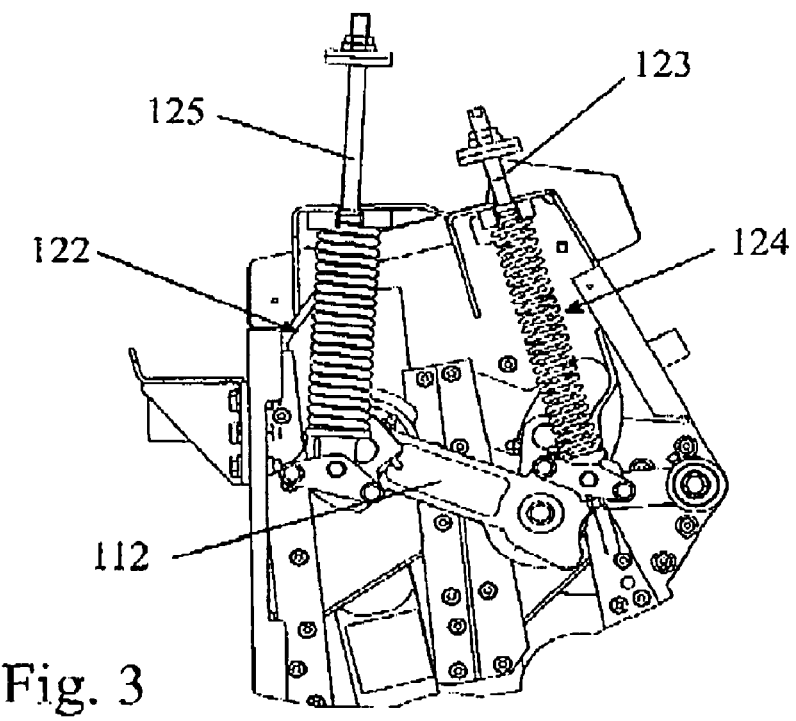
Figure 2:
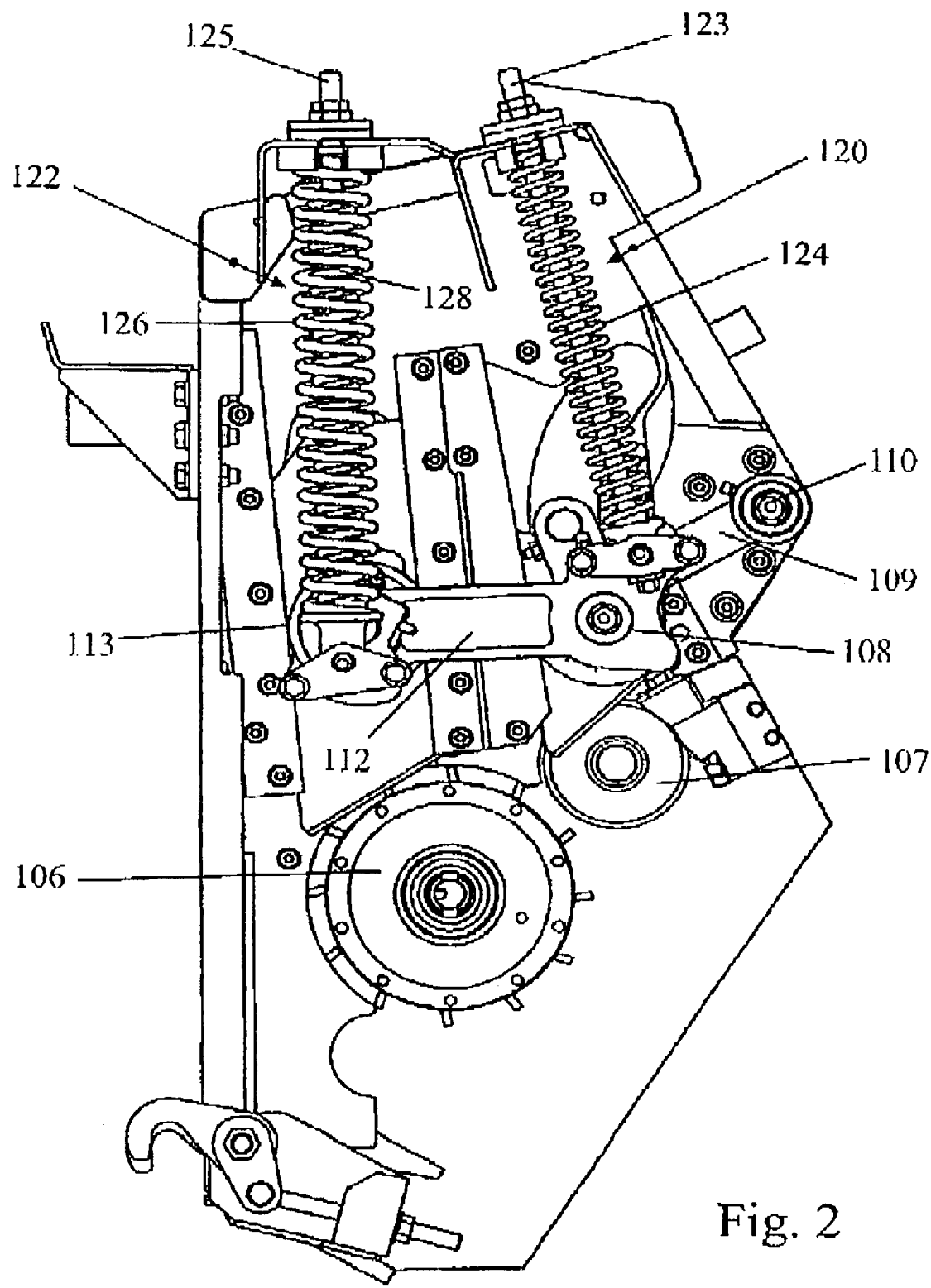
Figure 4A:
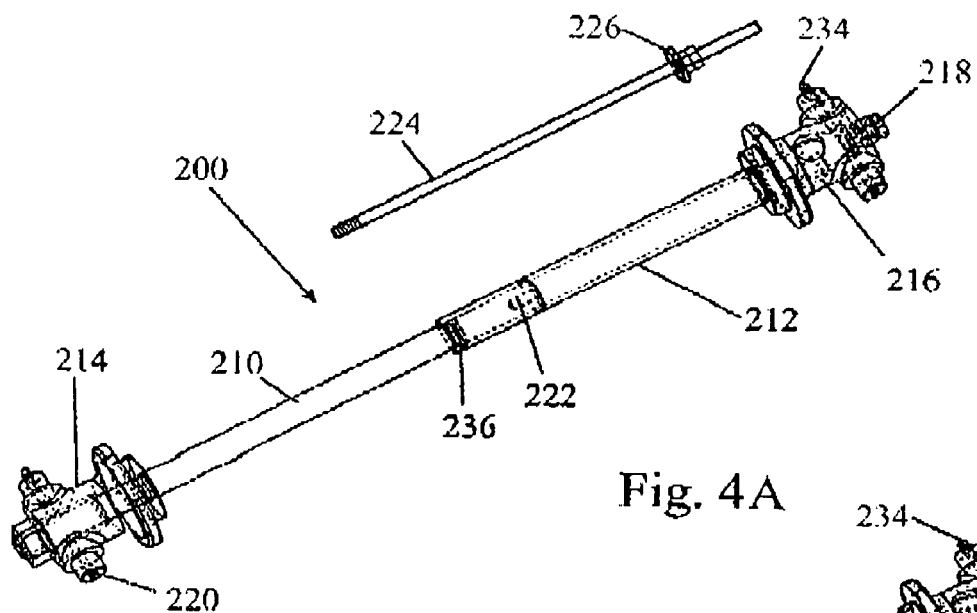
Figure 4B:
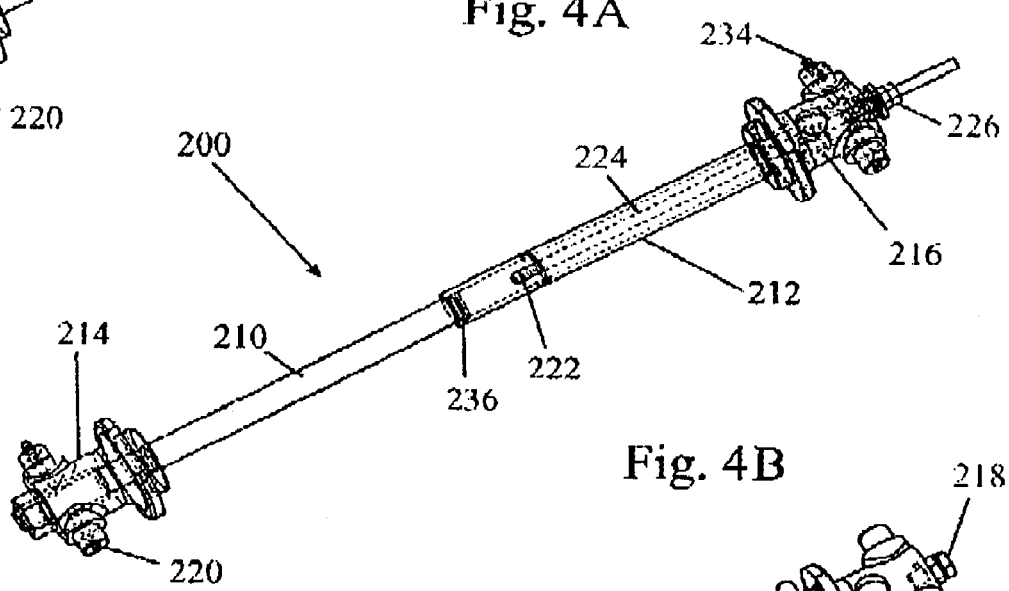
Figure 5:
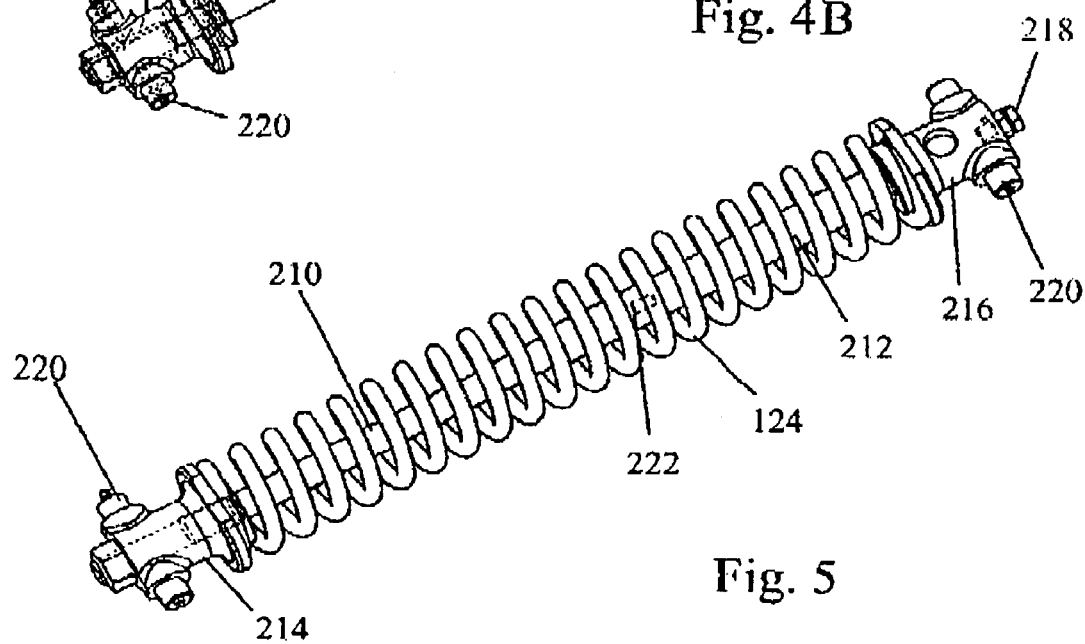
FIG. 5 shows a perspective view of the entire spring system.

The guide rod 200 shown in FIGS. 4 and 5 is intended as a replacement for either one of the guide rods 123 and 125, in other words, the spring system of the invention may be used for the pre-pressing or the pressing roller and it may comprise either one or two concentric springs.

The guide rod 200 is formed in two telescopically collapsible parts, namely an inner shaft 210 and an outer tube 212. Each of these two parts 210 and 212 is fitted at its outer end to a respective block 214, 216 that acts as an abutment for the spring(s) 124 or 126 and 128 surrounding the guide rod 200. The blocks 214 and 216 are shown as being threaded onto the guide rod 200 but other forms of fixing, such as welding, may alternatively be used. Each of the abutment blocks 214, 216 is also formed with trunnions 220 to allow the blocks to be pivotably connected to the bearing support 108, 113 of the associated roller or a mounting, such as a pair of brackets 232, on the casing 105 of the feeder device. The trunnions 220 pins can be seen to resemble those to be found in Cardan joints and they are assembled in a similar manner, i.e. by fitting over them caps lined with a full complement of bearing needles.

With the block 214 secured to the support of the bearing of the roller and the block 216 stationarily mounted on the casing 105 of the feeder device, movement of the roller can be accommodated by telescopic collapse of the guide rod 200 instead of any part of the guide projecting beyond the casing 105.

The block 216 on the outer tube 212 has a grease nipple 234 registering with the tube cavity. The opposite end of the outer tube 212 has an inner annular cavity 236 for holding a small amount of lubricant. The tube 212 is filled with grease before its first operation. The first full compression of the spring 124 evacuates most of the grease, but leaves a grease coating which enables movement of the inner shaft 210 within the tube 212 without excess wear. It is advisable to relubricate the guide rod 200 at least daily. Furthermore the surface of the shaft 210 may be hardened or hard-coated to increase its lifetime.

The guide rod 200 provides for a friction system which damps the movement of the roller and thereby equalise random jumps and drops of the corresponding pressing and pre-pressing rollers 103. During operation of the harvester and consequent movement of the rollers, the air inside the tube 212 may be allowed to escape or to enter through the clearance at the lower tube end or through a small orifice in the block 216.

To assist in the mounting and removal of the spring assembly, the end of the inner shaft 210 has a female thread 222 into which can be threaded a retainer rod 224, represented behind the guide rod 200 in FIGS. 4A and 4B. The rod 224 can be inserted into the outer tube 212 from the opposite end of the guide rod 200 after removal of a closing bolt 218 from the top of the block 216. A nut 228 threaded onto the rod 224 acts as an adjustable abutment.

Prior to fitting to a roller, the spring system is pre-assembled by reducing the length of the guide rod 210 to compress the spring and fitting the retainer rod 224 to keep the spring system compressed. The spring 124 may be compressed by a suitable clamp after which the rod 224 and the nut 224 are installed to retain the spring. Alternatively, a sufficiently long rod 224 may be threaded into the tube 212 and the nut 226 may screwed downwardly for bringing the spring 124 to length, without the use of dedicated tooling.

After installation of the compressed guide rod 200 in the feeder device 101, the rod 224 is removed so that expansion and collapse of the guide rod 200 are unhindered.

In a similar way, the rod 224 can be reinserted and the nut 226 tightened to compress the spring 124, to allow the spring system to be removed from a roller without the risk of injury due to sudden release of the tension in the spring 216.

Figure 6:
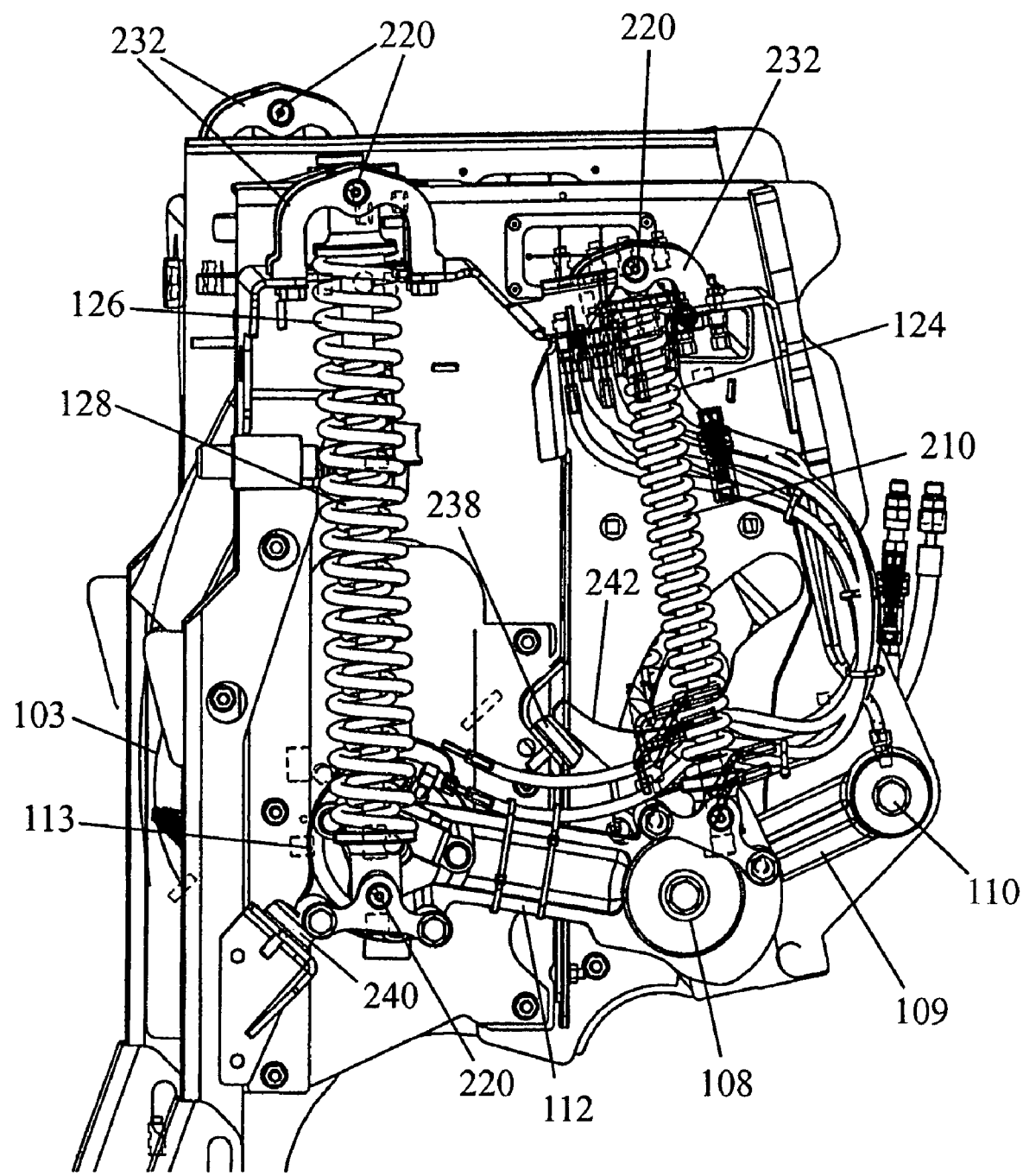
FIG. 6 shows a side view of the left side of the feeder device provided with the spring system of FIG. 4.

As illustrated in FIG. 6, the lowermost position of the pressing and pre-pressing rollers is defined by abutments provided on the outside of the casing 105. The arm 109 that holds the bearing support 108 of the pressing roller, has a protrusion 242 extending forwardly and upwardly from the bearing support 108. The protrusion 242 engages an abutment, which comprises a rubber cushioning element or damper 238, installed at an angle to the horizontal. Therefore, any stray crop material has no tendency to accumulate on the damper 238. Such accumulation would result in an increase of the minimal spacing between the feeder rollers, and hence in a diminished effectiveness of the feeder device 101, when the crop is fed in at lower rates. A similar damper 240 is provided adjacent the front bearing support 113. It is equally installed at an inclined angle for the same reasons. The spacing of the rollers can be modified by installing and removing washers between the dampers 238, 240 and their supports on the casing 105.

The invention claimed is:

1. A spring system for a feeder device of an agricultural harvester having a first roller movably mounted in a casing and biased by the spring system towards a second roller in order to compress crop passing between the two rollers, wherein the spring system comprises at least one spring surrounding a guide rod that extends between a movable support of the first roller and the casing of the feeder device, wherein the guide rod is formed from an inner shaft and an outer tube, wherein the inner shaft and the outer tube each have first and second ends, respectively, wherein the first end of the inner shaft is coupled to the first end of the outer tube to form a telescopic relationship between the inner shaft and the outer tube, for wherein the second end of the inner shaft is connectible to the movable roller support and the second end of the outer tube is connectible to the casing of the feeder device and further wherein the retaining rod is provided for limiting the telescopic extension the guide rod, the retaining rod having a first and second end, the first end of the retaining rod threadedly engageable with the first end of the inner shaft and passing through the outer tube, the second end of the retaining rod having an abutment for engaging the second end of the outer tube to limit extension of the guide rod.

2. A spring system as claimed in claim 1, wherein the guide rod is pivotably connectible to the movable roller support and the casing.

3. A feeder device of an agricultural harvester having a spring system as claimed in any preceding claim, wherein movement of the first roller towards the second roller is limited by contact between a bearing support of the first roller and a casing surface of the feeder device.

4. A feeder device as claimed in claim 3, wherein the casing surface is inclined relative to the direction of movement of the first roller to avoid trapping of debris between the bearing support of the first roller and the casing of the feeder device.

5. A feeder device as claimed in claim 3, wherein a cushioning element is provided at the casing surface to dampen impact between the bearing support of the first roller and the casing.

* * * * *